United States Patent [19]

Williams

[11] 4,343,718

[45] Aug. 10, 1982

[54] AQUEOUS FOAMING AGENT SOLUTION

[75] Inventor: James H. Williams, Louisville, Ky.

[73] Assignee: Borden, Inc., Columbus, Ohio

[21] Appl. No.: 141,018

[22] Filed: Apr. 17, 1980

Related U.S. Application Data

[60] Division of Ser. No. 63,823, Aug. 6, 1979, which is a continuation of Ser. No. 7,482, Jan. 29, 1979, abandoned.

[51] Int. Cl.³ .............................................. B01F 17/12
[52] U.S. Cl. .................................................... 252/352
[58] Field of Search ................................. 252/352, 307

[56] References Cited

U.S. PATENT DOCUMENTS 3,997,467 12/1976 Jederstrom ...................... 252/307 X
4,225,680 9/1980 Williams ........................... 252/352 X Primary Examiner—Bernard Helfin
Attorney, Agent, or Firm—George P. Maskas; Kenneth P. Van Wyck; Sidney Millard

[57] ABSTRACT

This foaming system includes a foaming agent solution and a resin solution. The foaming agent includes the relative amounts of 15 to 30 parts by weight of a salt of an alkyl diphenyl oxide sulfonate, 10 to 25 parts of 85% phosphoric acid and 15 to 25 parts urea, all in an aqueous solution. The resin solution includes a resin prepared by reacting 1 to 2.4 mols of formaldehyde per 1 mol of urea, 6.5 to 500 mmols polyethylene glycol as foam charring agent, 0.3 to 1.2 mmols of calcium carbonate as uniform foam cell size agent, 3 to 310 mmols of dicyandiamide as foam hydrolysis resistance agent, 2 to 30 mmols of sodium bromide as foam aging agent, and sufficient water to make a 35 to 45% solution. In preparing the foam, one part by weight of the foaming agent solution of about 5% solids concentration is aerated and then 1.0 to 1.5 parts by weight of the resin solution is sprayed thereon to obtain foam with an average linear shrinkage of about 0.25%.

4 Claims, No Drawings

AQUEOUS FOAMING AGENT SOLUTION

This application is a divisional application of application Ser. No. 63,823 filed on Aug. 6, 1979 which in turn is a continuation of application Ser. No. 7,482 filed on Jan. 29, 1979, now abandoned.

This invention relates to a urea formaldehyde foam which can be used for insulating purposes and more specifically, to a foaming agent which is used to make foam which has very low shrinkage.

The subject matter claimed herein represents an improvement over the subject matter claimed in the Widman U.S. Pat. No. 3,979,341 entitled "Urea Formaldehyde Foam." Foam samples falling within the claims of the Widman patent were compared to samples prepared pursuant to the invention claimed herein by conducting shrinkage tests in accordance with the Department of Housing and Urban Developments Use of Materials Bulletin No. 74. Whereas shrinkage for the Widman foam was 3.2%, my foam showed an incredibly low shrinkage of only 0.25%.

shrinkage is a critical property of insulating foams since it translates into disproportionately large losses in insulating value. For this reason, efforts have been made in the past to reduce shrinkage and thus increase the insulating value of foams. My invention has reduced shrinkage of insulating foam to such a low value that insulating property of the foam is not materially affected thereby.

In addition to very low shrinkage, my foam also has the other necessary properties for insulating foams including flame-retardency, thermal insulation and sound insulation properties.

The novel aspect of my invention resides in the foaming agent which is composed of the following components in relative amounts specified:

|  | parts by weight |
| --- | --- |
| anionic surfactant | 15–30 |
| 85% phosphoric acid | 10–25 |
| urea | 15–25 |

Phosphoric acid is used as a catalyst and urea, as a reactant for free formaldehyde and as a cross-linking agent to reduce hydrolysis.

The foaming agent can be stored in the form of a concentrate containing 15 to 40 parts of water, together with the components in amounts specified above. The concentrate is diluted prior to use to a dilute solution and preferably to a solution containing about 5% solids. As used herein, concentration on a solids basis means a concentration of nonaqueous components. Also, a dilute solution means a solution having up to about 20% solids concentration.

The anionic surfactants which appear to be suitable for my purpose are described in the technical literature as salts of alkyl diphenyl oxide sulfonates which can be mixtures of salts having the following structural formulas I and II:

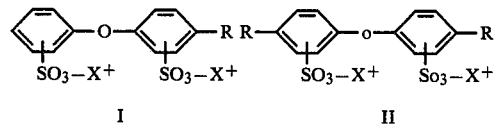

where R is linear or branched chain containing from about 6 to about 16 carbon atoms and where X is selected from sodium, potassium, ammonium, magnesium, calcium and triethanolamine cations. The broader definition of X includes alkali metals as well as alkaline earth metals. Preferred surfactant is Dowfax 2A1, wherein R is a branched chain containing 12 carbon atoms. This surfactant comes in the form of a 45% aqueous solution.

The foam is prepared by atomizing air at about 80 psi in the foaming agent to form a froth and then spraying the urea formaldehyde resin solution onto the froth. As already described, the foaming agent solution is an aqueous solution containing preferably about 5% solids concentration. The resin solution, on the other hand, has about 35 to 45% solids concentration.

In the preferred embodiment, the urea formaldehyde resin solution is the same one that is disclosed in the Widman patent. It is composed of the following ingredients, or suitable substitutes therefore, in amounts specified either on molar basis or on the basis of the weight of the resin solution itself:

| Ingredient | Suggested Amount | Preferred Amount |
| --- | --- | --- |
| urea | 1.0 mole | 1.0 mole |
| formaldehyde | 1.0 to 2.4 moles | 1.5 mole |
| polyethylene glycol | 1 to 12% (6.5–500 mmols) | 3–6% |
| calcium chloride | 50 to 200 ppm (0.3–1.2 mmols) | 80–130 ppm |
| dicyandiamide | 0.1 to 10% (3–310 mmols) | 0.25–1% |
| sodium bromide | 0.1 to 1% (2–30 mmols) | 0.2% |
| water | remainder | remainder |

The term "mmols" used herein means millimols, or one thousandth of a mol.

The resin solution has a solids concentration of 30 to 60%, preferably from 35 to 45%. With respect to the u/f ratio, the total u/f ratio has to be considered as present in the finished resin, including back-added urea.

The urea-formaldehyde resin suitable for my purpose is prepared by reacting from 1.8 to 2.4 moles of formaldehyde per mol of urea, preferably starting with a 50% solution of formaldehyde. Methylolation is carried out under mildly alkaline conditions at reflux for about 10 minutes at pH 7.4 to 7.7. Condensation is carried out at an acidic pH and when dilutability range of 100 to 450% is reached, indicating completion of the condensation reaction, pH of the resin is adjusted to neutral or slightly alkaline level. If dilutability of the finished resin is allowed to exceed 450%, very poor and wet foam is produced with high density. If dilutability is less than 100%, resin of very short shelf life is obtained and the foam produced therefrom has high shrinkage. Sufficient urea is added to the condensed resin to bring the formaldehyde-urea ratio to a range of 1.0 to 1.8.

Polyethylene glycol is added so that it is present during the condensation of urea and formaldehyde. It is added in an amount of 6.5 to 500 mmols, preferably from 20 to 250 mmols. If too much polyethylene glycol is used, hydrolysis resistance is reduced. If not enough of it is used, resulting foam will be friable and will produce less char. Addition of polyethylene glycol to the resin reduces shrinkage, makes the resulting foam less fragile and more resilient and imparts the intumescent nature to the foam by promoting formation of a char layer when the foam is exposed to a flame. Molecular weight of polyethylene glycol should be in the range of 62 to 200. If polyethylene glycol having a molecular weight above about 200 is used, the resulting foam will not form a char although it will be non-flammable.

For the charring property of foam, one can use instead or as a partial replacement for polyethylene glycol, pentaerythritol, glycerine, sugars, other glycols or polyhydric alcohols, however, only polyethylene glycol imparts both the resiliency and the charring properties to the foam. Examples of suitable glycols include ethylene, diethylene, triethylene, tetraethylene, propylene and diproplene glycols. In general, suitable polyalkylene glycols have from 2 to 8 carbon atoms in the alkylene moiety and a molecular weight from 62 to 200.

In my system, polyethylene glycol, or its substitute, is condensed with the u/f resin. The prior art discloses the use of polyethylene glycols in u/f foams but it is not condensed with the resin but merely added as a separate component to the finished resin. This prior art practice results in foam which has less hydrolysis resistance and less uniform cell size than when polyethylene glycol is condensed with the resin.

Homogeneous foam of uniform cell size without large air pockets is obtained by incorporating into the foam a minute amount of an alkaline earth metal ions derived from water-soluble salts. These salts can be added before or after condensation of urea and formaldehyde. Amount of the ions may vary from 0.3 to 1.2 mmol, preferably between 0.5 and 0.8 mmol. Suitable alkaline earth metal ions include calcium, magnesium, barium, beryllium and strontium. The salt portion of the compound can be halide, carbonate, bicarbonate, sulfate, phosphate, nitrate, acetate, formate, alkylate in general, borate, chromate, dichromate, arsenate, cyamide, citrate, or any organic or inorganic acid radical providing a sufficiently soluble salt. The water used must be initially tested to determine its hardness before addition of an alkaline earth salt is made to make sure that the total amount of the ions present is in the specified range.

In a foam containing no alkaline earth ions, the foam particles containing resin are micelles since surfactant orients on the surface of the foam particles and makes them behave like a liquid. Such foam is dense, has non-uniform cell size and flows very wet. If a minute amount of alkaline earth ions, such as the calcium ions, is added to the foam, the ions react with the surfactant and coat the resin particle to make it water-insoluble. The result is that foam of good quality is formed having uniform cell size. If too many calcium ions are introduced, too much of the surfactant will be rendered water-insoluble and foam will collapse since function of the surfactant is to provide and maintain structural integrity of the foam.

Dicyandiamide is added to the resin to provide hydrolysis resistance to the foam. Amount thereof may be in the range of 3-310 mmols, preferably from 7-30 mmols. Dicyandiamide must be added to the finished resin since, if it is added during condensation of urea and formaldehyde, it would buffer the mixture to such an extent that it would take too long to reach the desired dilutability. As foam ages, dicyandiamide hydrolyzes slowly into alkaline fractions thereby neutralizing residual acid. It should be apparent that dicyandiamide, or any substitute therefor, must be watersoluble and must hydrolyze at a slow rate to slowly and uniformly neutralize the residual acid, however, it cannot be too alkaline so as to interfere with the curing process of the foam. Suitable total or partial substitutes for dicyandiamide of medium to low alkalinity include guanylurea, calcium cyanamide, guanidine derivatives and hexamethylenetetramine. For comparison purpose, high alkalinity materials include soldium hydroxide, any alkaline and alkaline earth hydroxides and carbonates, tertiary amines, tertiary phosphates, etc.

Sodium bromide, or any other water-soluble alkali metal halogen, is added to the resin in an amount from 2 to 30 mmol, preferably 4 mmol, on a molar basis. It has been determined empirically that in absence of sodium bromide, the foam has to be aged to obtain and develop fire retardancy property. Such aging may take one week to several months. When sodium bromide is used, however, aging of the foam is dispensed with since such foam exhibits good fire retardant properties immediately after its preparation.

Furfuryl alcohol is an optional ingredient which may be added to the resin in amount ranging from 0 to 150 mmol, preferably about 30 mmol. The function of furfuryl alcohol in the foam is to reduce formaldehyde odor and in this respect, it can be described as an odor-masking agent. Other materials which can be used in total or partial replacement for furfuryl alcohol include furfural, triethylamine, phenol, alkylphenols, and essential oils.

The foam is produced by introducing foaming agent solution into a foaming chamber together with air under pressure of 30 to 90 psi, preferably 80 psi. The outlet of the foaming chamber is closed off by a fine mesh screen. Pressurized air and foaming agent are mixed in the foaming chamber to produce a froth. The froth is conveyed out of the foaming chamber and sprayed with the resin solution. Relative amounts of the solutions used varies from about 1 part of the foaming agent solution to from 1.0 to 1.5 parts of the resin solution.

The following examples illustrate preparation of the foaming agent solution, the resin solution and the foam by frothing the foaming agent solution and then spraying the resin solution thereon. These examples are illustrative only and should not be construed as limiting the invention which is properly delineated by the appended claims.

EXAMPLE 1—PREPARATION OF THE FOAMING AGENT SOLUTION

The components listed below in specified amounts were mixed with sufficient amount of water to produce approximately a 5% aqueous solution:

|  | parts by weight |
|---|---|
| sodium salt of a $C_{12}$ diphenyl oxide | 50.67 |
| 85% phosphoric acid | 13.82 |
| urea | 17.28 |

The sulfonate used in this example is Dowfax 2A1 anionic surface active agent which is a sodium salt of a branched $C_{12}$ alkyl diphenyl oxide sulfonate, available from Dow Chemical Company.

EXAMPLE 2—PREPARATION OF THE U/F RESIN

| | | Weight Percent |
|---|---|---|
| (1) | 50% formaldehyde | 34.316 |
| (2) | water | 16.854 |
| (3) | triethanolamine (TEA) | 0.078 |
| (4) | urea | 17.195 |
| (5) | 26° Be ammonium hydroxide | 0.540 |
| (6) | 30% formic acid | 0.028 |
| (7) | polyethylene glycol 200 | 4.777 |
| (8) | 30% formic acid | 0.068 |
| (9) | 50% sodium hydroxide | 0.046 |
| (10) | urea | 5.729 |
| (11) | water | 18.698 |
| (12) | dicyandiamide | 1.039 |
| (13) | sodium bromide | .072 |
| (14) | anhydrous calcium chloride | .034 |
| (15) | water | .478 |
| (16) | sodium hydroxide | .057 |
| | | 100.000 |

Formaldehyde (1) is loaded into a thoroughly cleaned reactor followed by water (2) and triethanolamine (3). After the heat is turned on and solution temperature reaches 50° C., urea (4) and ammonium hydroxide (5) are added. This causes the temperature to drop off temporarily. The solution is heated to reflux and held at a mild reflux for 10 minutes following which, the heat is turned off. Formic acid (6) and polyethylene glycol (7) are added and pH of the solution is adjusted to about 4.6 or 4.7 with formic acid (8). Adjustment of pH at this point must be made slowly because too much acid added at once will cause a violent exotherm, thus, condensation will proceed at an uncontrollable rate. The solution is again heated to maintain a mild reflux at about 95° to 98° C.

Dilutability of the resin is checked every 15 minutes until 1000% is reached and then it is checked more frequently until dilutability of 280 to 350% is reached. Dilutability is determined by placing 2 cc of the resin at 25° C. into a graduated cylinder and water at 25° C. is slowly added until clouding occurs. A hundred times the amount of water divided by 2 gives percent dilutability.

After the desired dilutability has been achieved, the resin solution is immediately neutralized with caustic soda (9) and pH is adjusted to a range of 7.5 to 7.9 with additional caustic soda, if needed. Urea (10) is added and the resin solution is held for five minutes following which, water (11) is added and mixed for 5 minutes. Dicyandiamide (14) is introduced into the solution and the solution is cooled at such a rate as to reach 25° C. in 50 minutes.

If the solution is held for more than 5 minutes following the urea addition, or if it is cooled to 25° C. slower than in 50 minutes, a resin is obtained which produces foam with a high shrinkage factor and the resin itself will have a short shelf life. If the solution is held for less than 5 minutes or if it is cooled to 25° C. faster than in 50 minutes, the resin will not initially produce light foam but must be aged for a period of about several weeks to produce desirable foam. It appears that during this period, the resin is artificially aged to develop the desired properties.

Sodium bromide (13) is dissolved in the calcium chloride solution (14 and 15) and this solution is added to the batch. Stirring is continued for 30 minutes, pH of the finished resin solution is adjusted to the range of 7.4 to 7.7 with caustic soda (16) and the resin solution is discharged into a container.

Solids content of the resin solution is preferably 35 to 45%, specific gravity of 1.148 to 1.150 and viscosity of 10 to 20 cps (1/60).

After polyethylene glycol has been added, condensation should be completed in about 60 minutes. If more time is required to complete condensation, resulting resin will produce foam which will exhibit high shrinkage. Storage temperature of the resin solution should be above 12° C.

EXAMPLE 3—PREPARATION OF FOAM

Foaming agent solution is introduced into a foaming chamber through a nozzle which is 1.2 mm in a diameter. The foaming chamber is 6.7 cm long by 13 mm ID with the fine mesh screen of 100 mesh disposed at the bottom of the foaming chamber for the purpose of promoting mixing of the foaming agent with pressurized air. Air with the foaming agent solution is introduced into the foaming chamber to form a froth. The froth is conveyed out of the foaming chamber into a coupling and then into a mixing chamber in a hose. The coupling is 2 cm long by 7 mm ID and the hose is about 1.7 cm ID and about 6 feet long. The resin solution is sprayed onto the froth in the mixing chamber through a 1.2 mm spray nozzle to produce foam which is stable, flame retardant, has low shrinkage, long life expectancy and exceptional thermal and accoustical insulation properties. A special adapter is used to produce a resin solution spray in the form of a solid cone. As the foam is conveyed through the hose, additional mixing takes place to ensure a homogeneous foam composition with uniform air cells.

EXAMPLE 4—SHRINKAGE TESTS

The test procedure used herein was promulgated by the Department of Housing and Urban Development which specifies that linear shrinkage during curing in any direction shall not be more than 4.0%. The procedure provides for filling with foam three cavities each measuring 480×480×90 mm (18×18×3.5 inches) made from wood or plywood. The filled cavities are maintained with the long dimension in a vertical position for 28 days at 23±2° C. (73°±4° F.) and 50±5% relative humidity. The cavities are then opened and shrinkage is measured in the two principal directions. Average of the six determinations is reported as the linear shrinkage. If fractures of the specimens occur, the data should be discounted and the test repeated.

One sample of my foam was prepared, as described in Example 3, from the foaming agent solution described in Example 1 and the resin solution of Example 2. A prior art sample of foam was also prepared in the same way as described in Example 3 from the resin solution of Example 2 and a foaming agent solution consisting of, in parts by weight, 1.5 parts resorcinol, 91.8 parts water, 1.1 parts dibutyl naphthalene sulfonic acid and 1.6 parts phosphoric acid.

Results of the tests conducted in the manner described herein showed a linear shrinkage of 0.25% for my foam and 3.2% for the prior art foam.

I claim:

1. An aqueous foaming agent solution for making foam which is characterized by very low shrinkage comprising, in parts by weight, the following components in the indicated relative amounts:

15–30 parts of a surfactant selected from salts of mono- and disubstituted diphenyl oxide sulfonates, said substituents being selected from $C_6$ to $C_{16}$ linear and branched carbon chains and the salts being selected from alkali metal and alkaline earth metal salts, and mixtures thereof, 10–25 parts of 85% phosphoric acid, and 15–25 parts of urea.

2. Foaming agent solution of claim 1 wherein the salts are selected from sodium, potassium, ammonium, magnesium, calcium and triethanolamine salts of diphenyl oxide sulfonates.

3. Foaming agent solution of claim 1 wherein the surfactant is a sodium salt of a branched $C_{12}$ diphenyl oxide sulfonate.

4. Foaming agent solution of claim 1 wherein its solids concentration is about 5%.

* * * * *